United States Patent [19]

Arai et al.

[11] Patent Number: 4,957,808

[45] Date of Patent: Sep. 18, 1990

[54] THERMAL STENCIL PAPER FOR MIMEOGRAPH

[75] Inventors: Fumiaki Arai, Mishima; Masaru Kimura, Hirakata, both of Japan

[73] Assignees: Ricoh Company, Ltd., Tokyo; General Company Ltd., Osaka, both of Japan

[21] Appl. No.: 242,212

[22] Filed: Sep. 9, 1988

[30] Foreign Application Priority Data

Sep. 11, 1987 [JP] Japan ................................ 62-228151

[51] Int. Cl.$^5$ ........................ B32B 23/08; B32B 27/10

[52] U.S. Cl. .................................... 428/262; 428/264; 428/265; 428/290; 428/336; 428/421; 428/447; 428/511; 428/537.5

[58] Field of Search ............... 428/421, 447, 336, 511, 428/537.5, 262, 264, 265, 290

[56] References Cited

U.S. PATENT DOCUMENTS 4,587,165 5/1986 Ohmori et al. ................. 428/421 X 4,711,818 12/1987 Henry ............................ 428/447 X

OTHER PUBLICATIONS

Patent Abstracts of Japan, M-387 Jun. 14, 1985, vol. 9/No. 139-JP60-19591, Kamiyama.

*Primary Examiner*—Thomas J. Herbert

*Attorney, Agent, or Firm*—Oblon, Spivak, McClelland, Maier & Neustadt

[57] ABSTRACT

A thermal stencil paper for mimeograph comprising a porous support and a plastic film laminated on each other. The thermal stencil paper for mimeograph of this invention contains a novel release layer on the plastic film. The release layer is composed of a specific graft polymer whose branch polymer comprises a fluorocarbon or silicone resin. The graft polymer is prepared by copolymerizing a radically polymerizable monomer constituting a backbone polymer of said graft polymer and a radically polymerizable fluorocarbon or silicone prepolymer which has a polymerizable double bond at one terminal end of its polymer chain.

12 Claims, No Drawings

THERMAL STENCIL PAPER FOR MIMEOGRAPH

The present invention relates to thermal stencil paper for mimeograph comprising a plastic film laminated on a porous support. More particularly, it relates to such stencil paper for mimeograph of the type which is processed with a thermal element such as a thermal head.

BACKGROUND OF THE INVENTION

Two types of thermal stencil paper for mimeograph are known: one is of "infrared irradiation type" in which a sheet of thermal stencil paper is closely contacted with an original followed by irradiation with infrared rays to form an original plate for mimeograph; the other is of "thermal element type" where an original plate for mimeograph is formed by contacting a sheet of thermal stencil paper with a thermal element such as a thermal head and thereby giving energy to the paper.

Thermal stencil paper of the infrared irradiation type generally comprises a porous support, an adhesive, a film and an adhesion preventing layer. Various adhesion preventing layers have been proposed to prevent the film from adhering to an original during processing for forming an original plate and thus from breaking when the original is removed from the film: for example, Japanese Patent Publication (KOKOKU) No. 10093/1968 discloses a layer comprising sodium stearate; Japanese Patent Publication (KOKOKU) No. 1531/1972 discloses a layer comprising oleic aminesulfonate; and Japanese Patent Publication (KOKOKU) No. 5139/1972 discloses a layer of powder having a particle size of 0.2 mm or less and a melting point of 200° C. or higher. In these methods, such a layer is provided on the surface of the film.

Although these methods are effective for the infrared irradiation type, they may cause some problems when applied to the thermal element type: for example, head running cannot be operated in some cases; and/or when the number of running operation is higher, draff may be deposited on the head and sharp images cannot be produced.

It has also been proposed to use, as the adhesion preventing layer provided on the film, a release layer comprising a silicone with excellent release properties: for example, Japanese Patent Publication (KOKOKU) No. 30570/1973 uses a release layer comprising from 0.05 to 2.0 g/cm$^2$ of a silicone; Japanese Patent Application Laying-open (KOKAI) No. 92595/1983 uses a layer of a water soluble silicone oil; and Japanese Patent Application Laying-open (KOKAI) No. 153697/1983 uses a layer of a room temperature vulcanizable silicone.

However, when a silicone oil which is liquid at normal temperature is applied onto the film, the oil may migrate into the porous support during the storage of the film in the roll- or sheet-form, causing reduction in its adhesion preventing properties. On the other hand, the room temperature vulcanizable silicones applied onto the thermoplastic film must be allowed to stand for 3 or more days until they are dried, leading to low working efficiency in the production of stencil paper.

Thermal stencil paper for mimeograph is generally prepared by laminating a thermoplastic film in the form of a roll and a porous support in the form of a roll by an adhesive layer, applying a releasing agent and winding up the resulting laminate into a roll. When the room temperature vulcanizable silicones are employed as the releasing agent, the silicone may be transferred into the porous support during the storage period of the wound roll, which must be 3 days or more so as to ensure drying and curing of the agent.

In order to solve these problems encountered in the prior art, there has also been proposed the use of a thermosetting or ultraviolet-curing silicone resin in Japanese Patent Application Laying-open (KOKAI) No. 295098/1986, or a fluorocarbon resin in Japanese Patent Application Laying-open (KOKAI) Nos. 19591/1985 and 97891/1985.

However, when a release layer of the hot-setting silicone resin is provided on the thermoplastic film, heating above 100° C. should be required to cure the resin. During the heating, a substantial amount of heat is given to the thermoplastic film of 2 to 20 micrometers in thickness, which may lead to formation of wrinkles in the film and/or excessive curling of the produced thermal stencil paper for mimeograph. On the other hand, the use of ultraviolet-curing silicone resin requires special equipment for the production of stencil paper. Further, when thermal stencil paper for mimeograph made by using the thermosetting or ultraviolet-curing silicone resin is processed with a thermal head, only a little perforation of the paper can be effected even if head running is possible, so that no clear printed matter can be obtained. Finally, the use of fluorocarbon resin cannot well prevent the deposition of draff on the head.

Thus, any of the methods which have been proposed has some disadvantages and no satisfactory method has been provided for the production of thermal stencil paper for mimeograph.

SUMMARY OF THE INVENTION

It is a principal object of the present invention to provide novel thermal stencil paper for mimeograph which, unlike the conventional stencil paper of the prior art, can suitably be processed with a thermal head, exhibits excellent head running properties, causes no deposition of draff on the head, and can give clear and sharp printed images.

According to the present invention, a laminate-type thermal stencil paper for mimeograph comprising a plastic film composed of a thermoplastic resin and laminated on a porous support is provided which is characterized in that a layer consisting essentially of a graft polymer whose branch polymer comprises a fluorocarbon or silicone resin is provided on the surface of said film.

DESCRIPTION OF THE INVENTION

In the present invention, a graft polymer having a branch polymer comprising a fluorocarbon or silicone resin is used as a main component of the layer provided on the surface of said plastic film.

Such graft polymers may be synthesized by copolymerizing a fluorocarbon or silicone resin having a polymerizable functional group at one terminal end of the molecular chain, which will be the branch polymer, with one or more monomers which will constitute the backbone polymer.

The fluorocarbon or silicone resin skeleton which constitutes the branch polymer may be any of appropriate resins. Especially, fluorocarbon resins having polytetrafluloroethylene units represented by the formula—$(CF_2)$—and silicone resin having polydimethylsiloxane units represented by the formula—$(Si(CH_3)_2\text{-}O)$—are preferably used herein.

The polymerizable functional groups which may be linked to one terminal end of the fluorocarbon or silicone resin skeleton include those of the vinyl polymerization type having (meth)acryloyloxy, allyloxy, glycidyl methacrylate, or the like; and those of the polycondensation type having dihydroxyl, dicarboxyl, or the like.

The branch polymers may be synthesized by various methods, such as those disclosed in, for example, K. Ito, N. Usami and Y. Yamashita, Macromolecules, 13, 216 (1980); and Y. Yamashita, Y. Chujo, H. Kobayashi and Y. Kawakami, Polym. Bull., 5, 361 (1981).

Among such methods, preferred is the method in which a prepolymer having a terminal carboxylic acid or alcoholic group is synthesized by radical polymerization using a chain transfer agent and a double bond is introduced into the polymer by terminal group exchange.

The dicarboxylic acid or diol group can also be introduced into one terminal end of the skeleton polymer by using a chain transfer agent having a dicarboxyl or dihydroxyl group.

One preferred method for synthesizing the branch polymers having a silicone resin skeleton is a reaction of a living polymer anionically polymerized from a cyclic siloxane represented by the general formula (a):

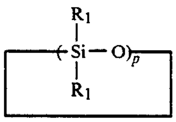

(a)

wherein $R_1$ is independently a methyl, ethyl or phenyl group, p is 3 or 4; with a radically polymerizable silicone compound represented by the general formula (b):

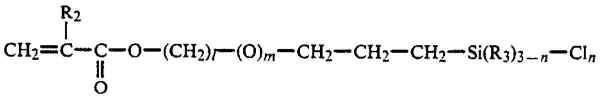

(b)

or

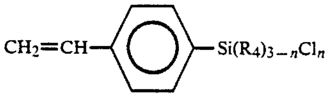

wherein $R_2$ is a hydrogen atom or a methyl group, m is 0 (zero) or 1 (one), $R_3$ and $R_4$ are independently methyl, ethyl or phenyl groups, n is an integer having a value of from 1 to 3, l is an integer having a value of from 0 to 2 if m=0 or l is 2 if m=1. See Japanese Patent Application Laying-open (KOKAI) No. 126478/1984.

The anionic polymerization of the cyclic siloxane (a) may be effected by conventional bulk or solution polymerization using any known anionic initiator.

Illustrative examples of the cyclic siloxanes represented by the general formula (a) may include hexamethylcyclotrisiloxane, octamethylcyclotetrasiloxane, hexaethylcyclotrisiloxane, octaethylcyclotetrasiloxane, hexaphenylcyclotrisiloxane and octaphenylcyclotetrasiloxane. Because of cost and suitability for the anionic polymerization, hexamethylcyclotrisiloxane and octamethylcyclotetrasiloxane are especially preferred herein.

The anionic initiator employed in the present invention may be any of known anionic initiators such as organic lithium compounds, alkali metal hydroxides, alkali metal alkoxides, and alkali metal silanolates. Among these, organic lithium compounds are especially preferred herein.

The molecular weights of radically polymerizable silicone branch polymers which result from said reaction of the living polymers obtained by the anionic polymerization with the radically polymerizable silicone compounds (b) will be governed by the molecular weights of said living polymers, which may in turn be controlled by the molar ratio of the intitiator to the cyclic siloxane. Preferably, the molar ratio of initiator/cyclic siloxane is in the range of from 0.01 to 0.2. With molar ratios less than 0.01, the resulting radically polymerizable silicone branch polymers will have very high molecular weights exceeding 20,000; on the other hand, molar ratios more than 0.2. will often give silicone branch polymers having very low molecular weights. Generally, the radically polymerizable silicone branch polymers have a number average molecular weight in the range of from 500 to 40,000. If the molecular weight is less than 500, the advantageous effects of the silicone such as low friction and releasing properties may be lowered. On the other hand, if the silicone branch polymers have molecular weights higher than 40,000, the resulting coating resins will often be oily.

The radically polymerizable silicone branch polymers can be obtained by the living polymerization termination reaction of said living polymer with the radically polymerizable silicone compound of the general formula (b). The reaction may easily be effected by simply mixing both reactants.

The radically polymerizable silicone compounds represented by the general formula (b) may easily be prepared by known methods.

For example, the compounds of the formula:

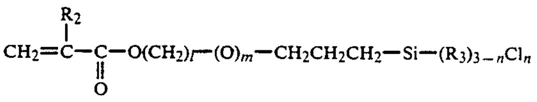

wherein $R_2$, l, m, $R_3$ and n are as defined previously, can be prepared by the hydrosilyating reaction of an unsaturated acrylate and/or methacrylate (hereinafter referred to as "(meth)acrylate") of the formula:

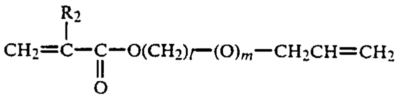

wherein $R_2$, l and m are defined previously, with a compounds of the formula:

$$HSi(R_3)_{3-n}Cl_n$$

wherein $R_3$ and n are as defined previously.

Preferably, said radically polymerizable silicone compound may be employed in such an amount that from 1 to 5 equivalents of the Si-Cl bond in the compound of the general formula (b) is present per equivalent (mole) of the starting living polymer in said living polymerization termination reaction.

Another preferred method for preparing the radically polymerizable silicone polymers comprises reacting one mole of a silicone represented by the general formula (a)':

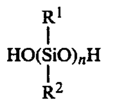

(a)' wherein $R^1$ and $R^2$ are monovalent aliphatic hydrocarbon groups having 1 to 10 carbon atoms, phenyl groups or monovalent halogenated hydrocarbon groups, and n is a positive number equal to or larger than 1 (one); with from 0.25 to 1 mole of an acryl compound represented by the general formula (b)':

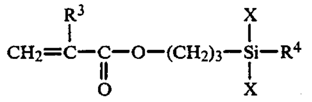

(b)' wherein $R^3$ is a hydrogen atom or a methyl group, $R^4$ is a methyl, ethyl or phenyl group, X is a chlorine atom, or a methoxy or ethoxy group. The condensation reaction is described in Japanese Patent Application Laying-open (KOKAI) No. 154766/1983. The detail of this method is described in the KOKAI patent specification.

Various silicones represented by the general formula (a)' are available, among which any compound suitable for the object of the present invention may be chosen. Particularly, silicones of the formula (a)' in which $R^1$ and $R^2$ are methyl groups may preferably be employed herein. The "n" in the general formula (a)' is a factor directly affecting the molecular weight of the silicones, and preferably ranges from 1 to 500, more preferably from 10 to 300. With "n" less than one, the advantageous effects of silicone such as low friction and release properties cannot be attained, whereas "n" exceeding 500 will give oily silicone graft copolymers, which are difficult to purify.

The acryl compounds represented by the general formula (b)' may include, for example, gamma-methacryloxypropyl methyl dichloro silane, gamma-methacryloxypropyl methyl diethoxy silane, gamma-methacryloxypropyl phenyl dichloro silane, gamma-methacryloxypropyl ethyl dichloro silane, gamma-acryloxypropyl methyl dichloro silane, etc. These acryl compounds are known and may easily be prepared by reacting a silicon compound with a compound having an aliphatic multiple bond in the presence of chloroplatinic acid.

The reaction of the silicones represented by the general formula (a)' with the acryl compounds represented by the general formula (b)' may well proceed in any conventional manner to produce the radically polymerizable silicone branch polymers. The reaction is the dehydrochlorination when X in the formula (b)' representing the acryl compounds is a chlorine atom, or the dealcoholic condensation when X is a methoxy or ethoxy group.

The acryl compound is employed in an amount of from 0.25 to 1 mole per mole of the silicone. If this amount is less than 0.25 mole, a large amount of unreacted silicone may remain after the production of coating resins. On the contrary, when more than one mole of acryl compound is used, gelation tends to occur in the production of coating resins.

Still another method for preparing the silicone branch polymers which may preferalby be employed in the present invention is described in Japanese Patent Application Laying-open (KOKAI) No. 20360/1984, wherein a radically polymerizable silicone branch polymer is synthesized under the same reaction conditions as disclosed in the aforementioned Japanese Patent Application Laying-open (KOKAI) No. 154766/1983 except that the acryl compounds represented by the general formula (b)' are replaced by acryl compounds represented by the following general formula (b)|:

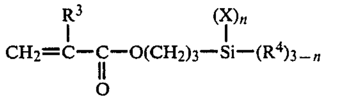

(b)'' wherein n is an integer having a value of from 1 to 3, and $R^3$, $R^4$ and X have the same meanings as in the above described general formula (b)'.

The products (radically polymerizable silicone branch polymers) obtained by the methods disclosed in the aforementioned Japanese Patent Application Laying-open (KOKAI) Nos. 154766/1983 and 20360/1984 contain, as major components, those compounds in which one molecule of the acryl compound (b)' or (b)'' is combined with one molecule of the silicone (a)' and, as minor components, unreacted silicone and biproduct, polyacrylic-functional silicones in which two or more molecules of acryl compound are combined with one molecule of silicone. Advantageously, these products can directly be employed as the radically polymerizable silicone branch polymers in the present invention.

Preferably, the radically polymerizable silicone branch polymer is herein employed in an amount of 3 to 60% by weight, especially 5 to 50% by weight, based on the graft polymer. If the amount of the radically polymerizable silicone branch polymer used is less than 3% by weight, desired graft polymers with excellent release properties cannot be obtained. On the other hand, if the amount of the radically polymerizable silicone branch polymer used exceeds 60% by weight, the radical polymerization thereof cannot proceed well, the resulting coatings have reduced mechanical strength and the cost for the production of such coatings is high.

The branch polymers of the present invention generally have a number average molecular weight in the range of from 500 to 40,000, preferably from 1,000 to 20,000, as determined by gel permeation chromatography (GPC) relative to polystyrene.

The backbone polymer in the graft polymer of the present invention comprises one or more radically polymerizable monomers. Illustrative examples of olefinic compounds which can be used as the radically polymerizable monomers in the present invention may include, for example, low molecular weight, unsaturated hydrocarbons such as ethylene and propylene; vinyl halides such as vinyl chloride and vinyl fluoride; vinyl esters of organic acids such as vinyl acetate; vinyl aromatic compounds such as styrene, substituted styrenes, vinylpyridine and vinylnaphthalene; acrylic acid, methacrylic acid, and derivatives thereof, such as methyl acrylate, methyl methacrylate, ethyl acrylate, ethyl methacrylate, butyl acrylate, hydroxyethyl methacrylate, 2-ethylhexyl acrylate, fluoroalkyl acrylates and fluoroalkyl methacrylates; acrolein; acrylonitrile; N-vinyl compounds such as N-vinylpyrrolidone and N-vinylcaprolactam, disubstituted ethylenes such as vinylidene chloride and vinylidene fluoride; maleic anhydride; maleic acid esters; fumaric acid esters; etc. These radically polymerizable monomers can be used either independently or in any combinations.

Preferred monomers constituting the backbone moieties of the graft polymers according to the present invention are one or more compounds selected from the class consisting of methyl acrylate (MA), methyl methacrylate (MMA), ethyl acrylate (EA), ethyl methacrylate (EMA), butyl acrylate (BA), vinyl chloride (VC), hydroxyethyl methacrylate (HEMA), 2-ethylhexyl acrylate (HA), and styrene (St).

Further, the graft polymers of the present invention may also comprise other radically polymerizable monomer(s) having a hydrolyzable functional group linked to the silicon atom or a hydroxyl group, these radically polymerizable monomers being hereinafter referred to simply as "crosslinkable monomers". Such graft polymers can be obtained by copolymerizing one or more crosslinkable monomers with the radically polymerizable silicone branch polymer(s) and the radically polymerizable monomer(s).

The crosslinkable monomer used in the present invention should have a hydrolyzable functional group or a hydroxyl group in the molecule so as to improve close contact of the graft polymer with a surface to be coated, water- and moisture resistance of the resulting coatings, and strength of the graft polymer itself.

The hydrolyzable functional groups contemplated in the present invention include alkoxy groups, acetoxy group, and groups represented by the general formula: $(OC_2H_4)_pOR$ wherein R is H or methyl or ethyl group, p is an integer of 1 to 5.

The crosslinkable monomers having a hydrolyzable functional group may include acrylic and/or methacrylic silanes represented by the general formula:

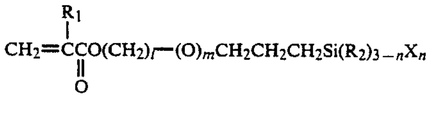

and ethylenic silanes represented by the formula:

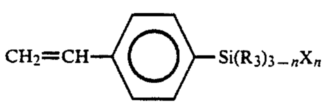

In these formulae, $R_1$ is a hydrogen atom or a methyl group, $R_2$ and $R_3$ are independently methyl, ethyl or phenyl groups, n is an integer having a value of from 1 to 3, m is zero or one, $\underline{1}$ is an integer of 0 to 2 if m=0 or $\underline{1}$ is 2 if m=1, and X is an alkoxy or acetoxy group, or a group of the general formula:

$$(OC_2H_4)_pOR_4$$

wherein $R_4$ is a hydrogen atom or a methyl or ethyl group and p is an integer of 1 to 5.

Illustrative examples of the crosslinkable silanes having a hydrolyzable functional group include gamma-(meth)acryloyloxypropyl methyl dimethoxy silane;
gamma-(meth)acryloyloxypropyl dimethyl dimethoxy silane;
gamma-(meth)acryloyloxypropyl dimethyl methoxy silane;
3-(2-(meth)acryloyloxyethoxy)propyl trimethoxy silane;
3-(2-(meth)acryloyloxyethoxy)propyl methyl dimethoxy silane;
3-(2-(meth)acryloyloxyethoxy)propyl dimethyl methoxy silane;
5-((meth)acryloyloxy)pentyl trimethoxy silane;
5-((meth)acryloyloxy)pentyl methyl dimethoxy silane;
5-((meth)acryloyloxy)pentyl dimethyl methoxy silane;
p-vinylphenyl trimethoxy silane; p-vinylphenyl methyl dimethoxy silane;
p-vinylphenyl dimethyl methoxy silane;
gamma-(meth)acryloyloxypropyl tri(beta-methoxyethoxy) silane; etc.

Among these silanes, gamma-(meth)acryloyloxypropyl tri(beta-methoxyethoxy) silane is preferred herein because of its availability and cost.

Any of known radically polymerizable monomers having a hydroxyl group can be used as the crosslinkable monomer in the present invention. Illustrative examples of such monomers may include, for example, 2-hydroxyethyl (meth)acrylate, 2-hydroxypropyl (meth)acrylate, 3-hydroxypropyl (meth)acrylate, 2-hydroxybutyl (meth)acrylate, 3-hyrdoxybutyl (meth)acrylate, 2,3-dihydroxypropyl (meth)acrylate, etc.

Among these hydroxyl group-containing radically polymerizable monomers, 2-hydroxyethyl (meth)acrylate is especially preferred because of its availability and cost.

The crosslinkable, radically polymerizable silicon compound monomers having a hydrolyzable functional group are preferably employed in an amount in the range of from 0.1 to 30% by weight, more preferably in the range of from 0.5 to 20% by weight, based on graft polymer. The crosslinkable, radically polymerizable monomers having a hydroxyl group are preferably used in an amount in the range of from 0.5 to 40% by weight, more preferably in the range of from 1 to 30% by weight, based on graft polymer.

If the crosslinkable monomers are used in an amount less than the above-described respective lower limits, it will not be expected to improve the chemical and heat resistance and mechanical strength due to crosslinking and curing of the resulting coatings. On the other hand, with amounts exceeding the above-described respective upper limits, the chemical and heat resistance and hardness of the resulting coatings will not be further improved, and pot life will be too short or difficult to control if a crosslinking catalyst is also employed.

The radically polymerizable branch polymer(s), the radically polymerizable monomer(s) and, optionaly, the crosslinkable monomer(s) are subjected to radical copolymerization to prepare the graft polymers of the present invention.

The radical copolymerization may be effected by any known methods as disclosed in Japanese Patent Application Laying-open (KOKAI) Nos. 126478/1984, 154766/1983 and 20360/1984, including radiation-initiated polymerization and radically initiated polymerization. The methods using radical initiators are herein preferred in view of easy operation and easy control of molecular weights. Any of solution polymerization in solvents, bulk polymerization, emulsion polymerization, etc. can be utilized. Solution polymerization is preferable wherein each reactant monomer can be uniformly dissolved in a solvent such as toluene or methyl isobutyl ketone (MIBK) and therefore uniform polymerization can be effected.

The graft polymers of the present invention may be used directly as such in the form of solution in any appropriate solvent, or they may be crosslinked before use in the following manner.

When the crosslinkable silanes are employed, a polymer solution obtained from the solution polymerization is directly, or after being further diluted with any suitable diluent solvent such as toluene, mixed with a small amount of any conventional curing catalyst commonly used for silane coupling agents such as dibutyltin dilaurate or dibutyltin maleate. The resulting coating composition may be applied onto an object (a film) to be coated followed bY drying to produce a crosslinked, cured coating with excellent release properties. During the crosslinking reaction, the graft polmers of the present invention in the coating composition are crosslinked each other through the hydrolyzable functional groups by means of atmospheric moisture.

The catalysts which can be used to promote the crosslinking and curing may be any known catalysts, for example, organotin compounds such as the aforementioned dibutyltin dilaurate and dibutyltin maleate; acidic compounds such as phosphoric acid and p-toluenesulfonic acid; amines such as ethylenediamine and triethylenetetramine. The catalyst is used in an amount in the range of from 0.001 to 10% by weight, preferably 0.01 to 8% by weight, based on coating resin.

When the hydroxyl group-containing crosslinkable monomers are employed, the graft polymer of the present invention is diluted with a solvent such as toluene, MIBK or methyl ethyl ketone (MEK), mixed with a polyvalent isocyanate, applied onto an object (a film) to be coated, and dried.

The polyvalent isocyanates may include tolylene diisocyanate, xylylene diisocyanate, hexamethylene diisocyanate, isophorone diisocyanate, methylenebis(4-cyclohexylisocyanate), and the compounds represented by the following formulae:

$CH_3CH_2C(CH_2OCONH(CH_2)_6NCO)_3$ and

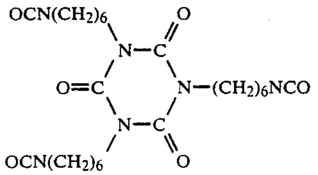

These isocyanate compounds may be independently or in any combination thereof.

When the isocyanates are utilized to attain the crosslinking of the graft polymer at room temperature, it is also possible to promote the room temperature curing by adding any known catalyst such as dibutyltin dilaurate.

The amount of the polyvalent isocyanate used as a curing agent will be determined in correspondence with the hydroxyl group content (OH equivalent) of said hydroxyl group-containing radically polymerizable monomer in the graft polymer of the present invention.

The hydroxyl group-crosslinkable graft polymers of the present invention can also be heat-cured by using a melamine, urea resin polybasic acid curing agent employed in conventional heat-curable acrylic coating compositions, whereby excellent release coating agents having as good properties (e.g., contact, water-, moisture-, solvent- and heat-resistance, and strength) as those coatings cured by said polyvalent isocyanates. The melamine curing agents may include butylated, methylated and epoxy-modified melamines. The urea resin curing agents may include methylated and butylated ureas. The polybasic acid curing agents may include long chain aliphatic dicarboxylic acids, aromatic polyvalent carboxylic acids, and anhydrides thereof. If the melamine or urea curing agent is used, the curing is promoted by addition of an acidic catalyst.

Preferably, the graft polymers of the present invention have a molecular weight in the range of from 5,000 to 200,000. Molecular weights less than 5,000 will give low strength of the resulting coatings. With molecular weights exceeding 200,000, viscosities are too high, causing a problem of coating operation.

According to the present invention, a release layer may be produced by dissolving said graft polymer in an appropriate solvent selected from aromatics, ketones, halogenated hydrocarbons, esters, alcohols and any mixtures thereof, and applying the resulting coating solution onto the surface of a plastic film by any conventional coating method such as gravure coating, reverse roller coating, roller coating, air knife coating, or the like.

The release layer according to the present invention has a thickness in the range of from 0.001 to 1.5 micrometers, preferably in the range of from 0.01 to 0.8 micrometers. Release layers having a thickness less than 0.001 micrometers cannot exhibit satisfactory release properties, while thicknesses larger than 1.5 micrometers will cause difficulty in making perforation.

In the release layer according to the present invention, the branch polymer having a fluorocarbon or silicone resin skeleton is oriented on the opposite side to the plastic film surface, i.e., it extends in the release layer from the backbone polymer toward the outermost surface of the stencil paper, while the backbone polymer is oriented along the plastic film surface (i.e., the interfacial surface between this release layer and the plastic film). Therefore, the release layer thus formed shows good contact with the plastic film. In addition, since the branch polymer with a fluorocarbon or silicone skeleton is oriented at or near the outer surface of the release layer, the resulting stencil paper exhibits excellent head running properties and prevents draff deposition on the head even during long period processing.

In addition to the specific graft polymer defined above as a main component, the release layer according to the present invention may optionally contain one or more auxiliary additives which may usually be employed in conventional release layers of this type, such as silicone resin surfactants, silicone oils, fluorocarbon surfactants, metal oxide particles, etc. Further, the present graft polymer can optionally be cured by isocyanates or melamine resins.

The porous supports used in the present invention may include Japanese(Tengujo) paper, synthetic fiber paper, various woven and non-woven fabrics, and the like.

The plastic film materials used herein may include polyvinyl chloride-vinylidene chloride, polyester, polyethylene, polypropylene, etc.

The porous support and the plastic film can be laminated by any conventionally known methods, including heat fusion, or use of an emulsion or solution type adhesive such a polyvinyl acetate resin or polyacrylate resin.

The thermal stencil paper for mimeograph according to the present invention will show excellent head running properties and no draff deposition on the head during operation for a long period of time, and give clear, beautiful printed images, since a layer consisting essentially of the graft polymer in which the branch polymer comprises a fluorocarbon or silicone resin is provided on the thermoplastic film.

DESCRIPTION OF THE PREFERRED EMBODIMENTS

The present invention will be illustrated by the following non-limiting examples.

Example 1

Base paper was prepared by laminating polyester film having a thickness of 2 micrometers and Japanese Tengujo paper having a basis weight of 12 g/m$^2$ by means of a chlorinated polypropylene resin. Thus, the adhesive resin was prepared in toluene at such a concentration that the amount thereof applied should range from 1.5 to 2 g/m$^2$, and applied onto the polyester film by a wire bar of 0.3 mm in diameter, and wet-lamination was then effected.

Then, thermal stencil paper for mimeograph according to the present invention was prepared by applying a coating solution defined below onto the film side of said base paper with a wire bar so that the applied amount after drying was 0.2 g/m$^2$ to form a release layer on the film.

The coating solution for forming a release layer had the following composition, all parts being by weight:

| | |
|---|---|
| Acryl silicone graft polymer (Toagosei Chemical Industry Co., Ltd., Japan, ARON XS-474; solid content 30%) | 100 parts |
| Isocyanate (NIPPON POLYURETHAN KOGYO, Japan; CORONATE EH) | 10 parts |
| Dibutyltin dilaurate | 1 part |
| Methyl ethyl ketone | 980 parts |

Example 2

The procedures of Example 1 were repeated except that the coating solution for forming a release layer was replaced by the following one:

-continued

| | |
|---|---|
| Acryl silicone graft polymer (Toagosei Chemical Industry Co., Ltd., Japan, ARON XS-474; solid content 30%) | 100 parts |
| Polyether-modified silicone oil | 1.5 parts |
| Methyl ethyl ketone/toluene mixture | 528 parts |

Example 3

The procedures of Example 1 were repeated except that the graft polymer was replaced by a graft polymer (molecular weight 100,000) of polydimethylsiloxane (molecular weight 5,000) having an acryloyloxy group at one terminal end and butyl methacrylate backbone.

Example 4

The procedures of Example 1 were repeated except that the graft polymer was replaced by a graft polymer (molecular weight 50,000) of polytetrafluoroethylene (molecular weight 5,000) having a methacryloyloxy group at one terminal end and butyl acrylate backbone.

Example 5

The procedures of Example 1 were repeated except that the coating solution for forming a release layer was replaced by the following one:

| | |
|---|---|
| Acryl silicone graft polymer (Toagosei Chemical Industry Co., Ltd., Japan, ARON XS-630; solid content 30%) | 100 parts |
| Methyl ethyl ketone/toluene mixture | 528 parts |

Example 6

The procedures of Example 1 were repeated except that the coating solution for forming a release layer was replaced by the following one:

| | |
|---|---|
| Silicone graft polymer (30% solution in methyl isobutyl ketone) | 10 parts |
| Methyl ethyl ketone | 590 parts |

The silicone graft polymer was synthesized from 40 parts by weight of silicone macromonomer (number average molecular weight 8,900) comprising 0.135 mol of octamethylcyclotetrasiloxane and 0.0141 mol of gamma-methacryloxypropyldimethylchlorosilane, 10 parts by weight of methyl methacrylate, and 50 parts by weight of butyl methacrylate.

Example 7

The procedures of Example 6 were repeated except that the coating solution for forming a release layer was replaced by the following one:

| | |
|---|---|
| Silicone graft polymer (30% solution in methyl isobutyl ketone) | 20 parts |
| Isocyanate (NIPPON POLYURETHAN KOGYO, Japan., CORONATE EH) | 5 parts |
| Dibutyltin dilaurate | 0.002 parts |
| Methyl ethyl ketone | 1180 parts |

The silicone graft polymer was synthesized from 40 parts by weight of the macromonomer of Example 6, 10 parts by weight of methyl methacrylate, 6 parts by weight of 2-hydroxyethyl methacrylate, and 44 parts by weight of butyl methacrylate.

Example 8

The procedures of Example 7 were repeated except that the coating solution for forming a release layer was replaced by 1% solution of the silicone graft polymer of Exampe 7 in methyl ethyl ketone.

Example 9

The procedures of Example 1 were repeated except that the coating solution for forming a release layer was replaced by the following one:

| | |
|---|---|
| Silicone graft polymer (30% solution in toluene) | 50 parts |
| Dibutyltin dilaurate | 0.002 parts |
| Methyl ethyl ketone | 2950 parts |

The silicone graft polymer was synthesized from 36 parts by weight of silicone macromonomer comprising 0.1 mol of alpha, omega-dihydroxydimethylpolysiloxane and 0.1 mol of gamma-methacryloxypropyldimethylchlorosilane, 10 parts by weight of methyl methacrylate, 50 parts by weight of butyl methacrylate, and 4 parts by weight of gamma-methacryloxypropyltrimethoxysilane.

Example 10

The procedures of Example 9 were repeated except that the coating solution for forming a release layer was replaced by the following one:

| | |
|---|---|
| Silicone graft polymer (40% solution in methyl isobutyl ketone) | 10 parts |
| Methyl ethyl ketone | 790 parts |

The silicone graft polymer was synthesized from 38 parts by weight of silicone macromonomer comprising 0.15 mol of alpha, omega-dihydroxydimethylpolysiloxane and 0.05 mol of gamma-methacryloxypropyltrimethoxysilane, 10 parts by weight of methyl methacrylate, 46 parts by weight of butyl methacrylate, and 6 parts by weight of 2-hydroxyethyl methacrylate.

Comparative Example 1

The procedures of Example 1 were repeated except that the graft polymer was substituted with dimetbylpolysiloxane homopolymer.

Comparative Example 2

The procedures of Exmaple 1 were repeated except that the graft polymer was substituted with polytetrafluoroethylene homopolymer.

Test Example

The thermal stencil paper for mimeograph obtained in Examples 1-10 and Comparative Examples 1-2 were processed using a thermal head with 16 dots/mm and applying energy of 0.16 mJ/dot, and tested in a mimeographic printer, PREPORT SS870, Ricoh Corp.

The thermal stencil paper of Examples 1-5 gave clear prints, whereas blurring or staining occurred and no clear print was produced with the stencil paper of Comparative Examples 1-2. Further, no draff deposition on the head was observed even after continuous processing over 300 m in the products of Examples 1-10, however, the products of Comparative Examples 1-2 caused a problem of draff deposition on the head.

What is claimed is:

1. A thermal stencil paper for use in a mineograph, comprising:

a laminate of a thermoplastic resin film on a porous support, with the surface of said film being provided with a layer consisting essentially of a graft polymer having branch polymer portions formed from a fluorocarbon or silicone resin prepared by copolymerizing a radically polymerizable polymer which forms the polymer branches of said graft copolymer with a radically polymerizable monomer which constitutes the backbone polymer component of said graft polymer, said radically polymerizable branched polymer component being prepared by modifying a terminal of a fluorocarbon or silicone prepolymer having a functional group at said terminus such that a radically polymerizable double bond is introduced into the polymer.

2. The thermal stencil paper of claim 1, wherein said porous support is a synthetic fiber paper, a woven or nonwoven fabric, or Japanese paper.

3. The thermal stencil paper of claim 1, wherein said silicone prepolymer having a terminal functional group is a living polymer prepared by anionically polymerizing a cyclic siloxane of the formula:

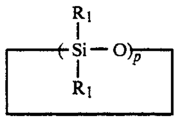

(a)

wherein $R_1$ is a methyl, ehtyl or phenyl group and p is 3 or 4.

4. The thermal stencil paper of claim 1, wherein said radically polymerizable monomer which constitutes the backbone polymer component of said graft polymer is formed from a monomer selected from the group consisting of low molecular weight unsaturated hydrocarbons, vinyl halides, vinyl esters, vinyl aromatic compounds, acrylic acid, methacrylic acid or derivatives thereof, acrolein, acrylonitrile, N-vinyl compounds, disubstituted ethylene compounds, maleic anhydride, maleic acid esters and fumaric acid esters.

5. The thermal stencil paper of claim 1, wherein said polymer layer on the surface of said film has a thickness within the range of 0.001 to 1.5 μm.

6. The thermal stencil paper of claim 1, wherein the thermoplastic resin of said thermoplastic film is polyvinyl chloride-vinylidene chloride, a polyester, polyethylene or polypropylene.

7. The thermal stencil paper of claim 1, wherein said fluorocarbon or silicone prepolymer has a terminal hydroxyl or carboxyl functional group.

8. The thermal stencil paper of claim 7, wherein said silicone prepolymer having a terminal hydroxyl group is a polydimethylsiloxane.

9. The thermal stencil paper of claim 1, wherein said graft polymer contains from 3 to 60% by weight of said silicone branch polymer component.

10. The thermal stencil paper of claim 9, wherein the amount of said silicone branch polymer component ranges from 5 to 50% by weight of the graft polymer.

11. The thermal stencil paper of claim 1, wherein said polymerization reaction is conducted further with a crosslinkable monomer.

12. The thermal stencil paper of claim 11, wherein said crosslinkable monomer is an acrylic and/or methacrylic silane compound of the formula:

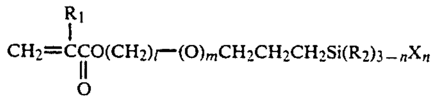

or an ethylenic silane of the formula:

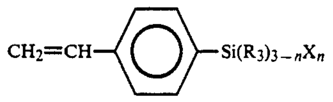

wherein $R_1$ is hydrogen or methyl, $R_2$ and $R_3$ are each independently methyl, ethyl or phenyl, n is an integer of 1 to 3, m is 0 or 1, l is 0, 1 or 2 if m=0 or l is 2 if m=1, and X is an alkoxy or acetoxy group or a group of the formula: $(OC_2H_4)_pOR_4$, wherein $R_4$ is hydrogen, methyl or ethyl and p is an integer of 1 to 5.

* * * * *